Dec. 25, 1956 — C. C. MONDARO — 2,775,290
BEAD RELEASER FOR VEHICLE TIRES
Filed March 1, 1955 — 2 Sheets-Sheet 1
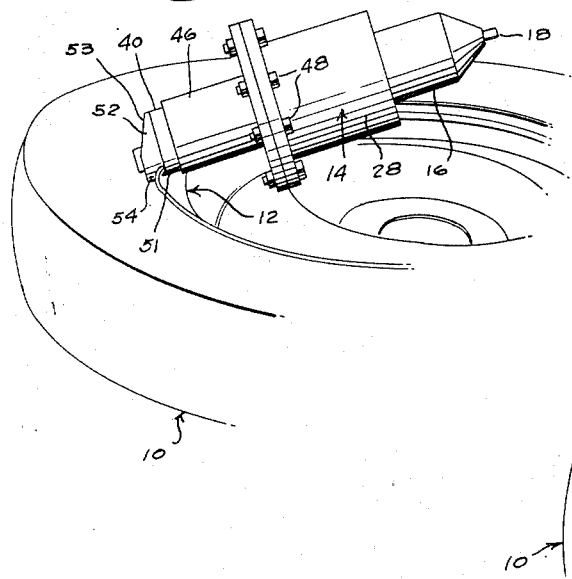
Fig-1-A
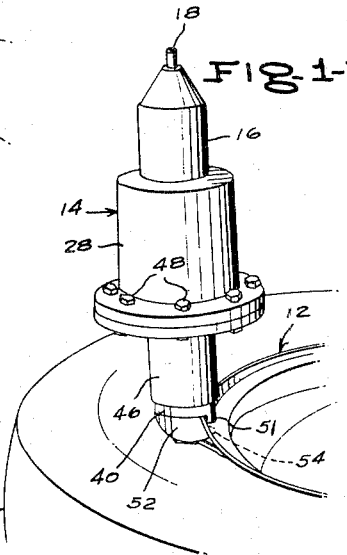
Fig-1-B
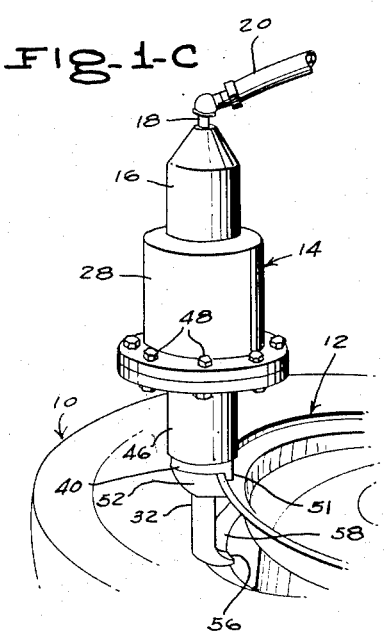
Fig-1-C
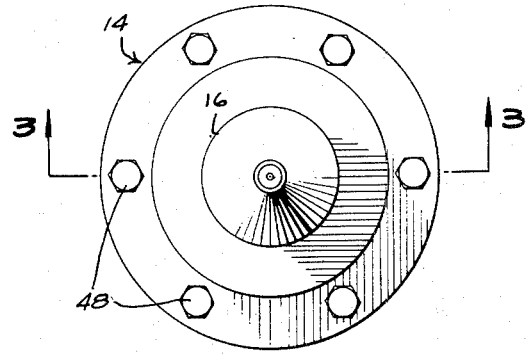
Fig-2
INVENTOR.
CHARLES C. MONDARO
BY
McMorrow, Berman + Davidson
ATTORNEYS

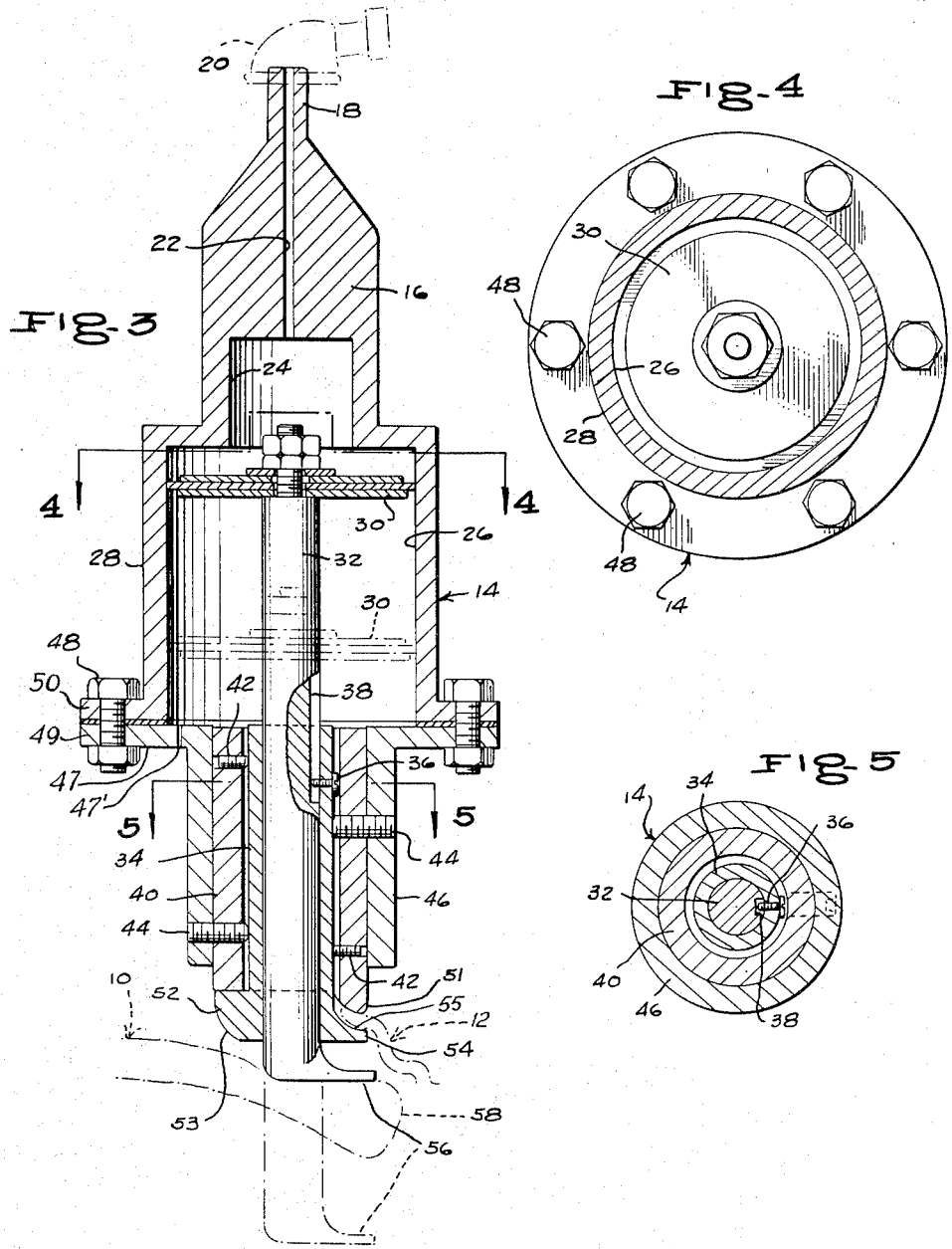
Dec. 25, 1956   C. C. MONDARO   2,775,290
BEAD RELEASER FOR VEHICLE TIRES
Filed March 1, 1955   2 Sheets-Sheet 2
INVENTOR.
CHARLES C. MONDARO
BY
McMorrow, Berman + Davidson
ATTORNEYS

United States Patent Office 2,775,290
Patented Dec. 25, 1956

2,775,290

BEAD RELEASER FOR VEHICLE TIRES

Charles C. Mondaro, Passaic, N. J.

Application March 1, 1955, Serial No. 491,396

1 Claim. (Cl. 157—1.17)

This invention relates to improvements in fluid pressure operated devices for breaking away the bead of a pneumatic tire from the flange of an associated rim on which the tire is mounted.

The primary object of the invention is to provide a more efficient, more easily manipulated device of the character indicated above, which is composed of relatively few simple parts, and can be made in a rugged and serviceable form at relatively low cost.

Other objects of the invention will appear from the following description, the claims appended thereto, and from the annexed drawing, in which like reference characters designate like parts throughout the several views, and wherein:

Figures 1a, 1b, and 1c are fragmentary perspective views of a vehicle tire and wheel rim, showing a device in accordance with the present invention applied thereto in successive stages of the operation of the device in breaking the tire bead away from the rim;

Figure 2 is an enlarged top plan view of the device per se;

Figure 3 is a longitudinal sectional view on line 3—3 of Figure 2;

Figure 4 is a transverse sectional view on line 4—4 of Figure 3; and

Figure 5 is a transverse sectional view on line 5—5 of Figure 3.

Referring in detail to the drawings, the numeral 10 designates a tire in place on a conventional wheel rim 12, the tire having a bead 58 engaged under the rim.

The illustrated bead releaser device 14 comprises a cylindrical, relatively short solid block 16 having a tapered outer end portion merging into an axial terminal 18 on which is adapted to be seated the outlet fitting of a compressed air hose 20 such as used in automobile service stations or the like for the purpose of inflating tires.

An axial passage 22 in block 16 extends between the outer end of terminal 18 and the inner end of a counterbore 24 formed in the inner end portion of the block 16. Counterbore 24 opens into a cylinder 28 having a diameter substantially greater than that of the counterbore, the cylinder 28 preferably being formed integrally with the inner end of block 16. A disc piston 30 works in the cylinder 28, and is secured to one end of a piston rod 32 which extends slidably through an elongated inner sleeve 34. Through the wall of the sleeve is threaded a guide screw 36 the inner end of which extends into a longitudinal guide groove 38 formed in the piston rod, to prevent relative rotation between the piston rod 32 and the inner sleeve 34.

Surrounding inner sleeve 34 is an outer sleeve 40 having diametrically opposed, radially extending set screw bores spaced longitudinally thereof, which receive screws 42, the screws bearing against the inner sleeve 34 and detachably secure the inner and outer sleeves 34 and 40 respectively together.

Spaced longitudinally of the outer sleeve 40 at diametrically opposed locations therein, are other radial, tapped bores larger in diameter than the bores of screws 42. Engaging in the last named bores are set screws 44 having inner ends engaged with and holding the inner sleeve 34 in place. Set screws 44, at their outer ends, are engaged in radial bores formed in a tubular portion 46 and securing the portion 46 to the outer sleeve 40, the portion 46 having a head 47 closing the adjacent end of the cylinder 28. The tubular portion 46, at its inner end, is integral with an outwardly directed flange 49 having a circumferential series of openings receiving bolts 48 passing through a similar flange 50 formed upon the adjacent end of the cylinder 28, for the purpose of fixedly securing the cylinder head in place. An air vent 47' traverses the cylinder head.

The inner sleeve 34 at its outer end projects beyond the outer end of the outer sleeve, and is formed with an enlargement 52. The enlargement 52 is substantially circular, having an outer diameter substantially equal to that of the outer sleeve. The periphery of the enlargement 52, as shown in Figure 1a and also in Figure 3, is beveled as at 53 except for a portion thereof at one side of the enlargement, where the edge of the enlargement is cut away to define a lip 54 whose inner surface 55 is curved outwardly in a radial direction.

Extending longitudinally from one side of the outer end of the outer sleeve 40 is a longitudinal convex extension 51 with which the concave inner surface 55 of the lip 54 is aligned. The projection 51 and the lip surface 55 are spaced from each other to define a space to receive the rim flange 12.

Formed upon the outer end of the piston rod 32, below lip 54, is a radial presser foot 56 adapted to seat against the bead 58 of the tire 10 beneath the rim 12.

In use, the device is first positioned as in Figure 1a. The device in this position is disposed at a slight inclination from the horizontal, with the edge of the rim flange 12 engaging between lip 54 and projection 51.

The device is then rocked upwardly about the axis of the rim flange 12, to the erect position of Figure 1b, wherein the presser foot 56 is engaged with the upper side of the tire bead 58, the foot 56 being in a retracted position.

An air hose fitting 20 is then engaged over the projection 18, and air under pressure applied to the device. It will be understood that the projection 18 could be provided with a suitable tire valve, such as is usually found on automotive vehicle tires.

When the air hose fitting 20 is pressed downwardly over the projection 18, air is forced under pressure into the cylinder 28 so as to drive the piston 30 downwardly from the full line to the dotted line position of Figure 3. As a result, the presser foot 56 is extended to the dotted line position in Figure 3 or the full line position shown in Figure 1c. In this position, the presser foot has broken the bead 58 away from the rim flange 12.

The device can now be shifted around the rim 12 to various locations, as desired, should the tire bead 58 still stick at said locations to the rim. Usually, however, this is not necessary, since once the bead 58 is broken away from rim 12 in the manner described and shown, the tire can be stepped on to break the bead 58 away from the rim 12 throughout the circumference of the rim.

By having the cooperating longitudinal convex extension 51 and the lip 54 on separate elements, namely, outer and inner sleeves 40 and 34 respectively, with the outer and inner sleeves detachably secured together and to the tubular portion 46 it is necessary to replace only the one of the parts which may be rendered useless by use. If the outer and inner sleeves 40 and 34 and the tubular portion 46 were all brazed or welded together, all three parts would have been replaced in the event of one of the parts being rendered useless.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claim.

What is claimed is:

In a device for releasing a tire bead from beneath a wheel rim flange, a cylinder having an outer end and an open inner end, a block on and closing said outer end, a projection on said block for receiving an air pressure hose fitting, a passage through said projection and said block leading into said cylinder, a cylinder head secured to the open inner end of said cylinder and having a tubular portion extending axially away from the head of the cylinder, said tubular portion having an outer sleeve secured in said tubular portion, said outer sleeve having an outer end reaching outwardly beyond the outer end of said tubular portion and a bore, an inner sleeve within said bore of the outer sleeve, first means on said outer sleeve engaging said inner sleeve to thereby secure the inner and outer sleeves together, second means traversing said tubular portion of the cylinder head and said outer sleeve and engaging said inner sleeve and serving to lock said outer sleeve in said tubular portion and to lock said inner sleeve in place in the bore of the outer sleeve, a piston working in said cylinder, a piston rod connected to the piston and slidably extending through said inner sleeve, third means on the inner sleeve engaging the piston rod and precluding rotation of the piston rod relative to the inner sleeve, air vent means for said cylinder between the piston and said cylinder head, a longitudinal projection on one side of said outer end of the outer sleeve, an enlargement on the outer end of the inner sleeve beyond the outer end of the outer sleeve, said enlargement comprising a lip aligned with and spaced outwardly from said longitudinal projection so as to provide a rim flange receiving space therebetween, said piston rod having an outer end, and a radial tire bead presser head on the outer end of the piston aligned with said lip.

References Cited in the file of this patent
UNITED STATES PATENTS

| | | |
|---|---|---|
| 1,507,208 | Schlenker | Sept. 2, 1924 |
| 1,547,544 | Wertz | July 28, 1925 |
| 2,520,330 | Northrup et al. | Aug. 29, 1950 |
| 2,606,602 | Manupello | Aug. 12, 1952 |
| 2,679,896 | Branick | June 1, 1954 |